United States Patent
Ligameri et al.

(10) Patent No.: US 10,007,378 B2
(45) Date of Patent: Jun. 26, 2018

(54) INFORMATION HANDLING SYSTEM TOUCHSCREEN TOOL DISCRIMINATION

(71) Applicant: Dell Products L.P., Round Rock, TX (US)

(72) Inventors: Mark R. Ligameri, Santa Rosa, FL (US); Michiel Sebastiaan Emanuel Petrus Knoppert, Amsterdam (NL); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 15/191,908

(22) Filed: Jun. 24, 2016

(65) Prior Publication Data
US 2017/0371474 A1 Dec. 28, 2017

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01)

(58) Field of Classification Search
CPC ................................ G06F 3/0416; G06F 3/044
See application file for complete search history.

(56) References Cited

U.S. PATENT DOCUMENTS

| | | | | |
|---|---|---|---|---|
| 9,013,452 B2* | 4/2015 | Harrison | ............... | G06F 3/0488 345/177 |
| 9,019,244 B2* | 4/2015 | Harrison | ............. | G06F 3/03545 345/177 |
| 9,134,857 B2* | 9/2015 | Park | ....................... | G06F 3/0418 |
| 9,244,545 B2* | 1/2016 | Hinckley | ................. | G06F 3/038 |
| 9,329,715 B2* | 5/2016 | Schwarz | .................. | G06F 3/041 |
| 2009/0078474 A1* | 3/2009 | Fleck | ..................... | G06F 3/0418 178/18.02 |
| 2014/0210788 A1* | 7/2014 | Harrison | ............... | G06F 3/0416 345/174 |
| 2016/0170530 A1* | 6/2016 | Lee | ......................... | G06F 3/044 345/174 |
| 2016/0299615 A1* | 10/2016 | Schwarz | .................. | G06F 3/01 |

* cited by examiner

*Primary Examiner* — Ricardo L Osorio
(74) *Attorney, Agent, or Firm* — Zagorin Cave LLP; Robert W. Holland

(57) ABSTRACT

An information handling system touchscreen discriminates touches with a tool discriminator before analyzing the touches with a touch discriminator that identifies touches as intended or unintended inputs. The tool discriminator isolates touches associated with tools to assign tool functions to tool touches so that touch discriminator analysis is bypassed for tools, thus providing a more rapid and accurate horizontal workspace having tools placed on the touchscreen.

18 Claims, 4 Drawing Sheets

INFORMATION HANDLING SYSTEM TOUCHSCREEN TOOL DISCRIMINATION

BACKGROUND OF THE INVENTION

Field of the Invention

The present invention relates in general to the field of information handling system input/output (I/O) devices, and more particularly to an information handling system touchscreen tool discrimination.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often support presentation of visual images at multiple display devices. In part, this has resulted from the increased capabilities of graphics processing units (GPU) that process information into pixel values presented at a display. Improved processing capability has allowed presentation of visual information with increased resolutions using increased numbers of pixels. A GPU supports multiple displays by driving pixel values for the multiple displays with the pixel values communicated through a cable or wireless interface, such as a DisplayPort cable or IEEE 802.11a wireless interface. As an example, portable information handling systems typically include an integrated display and a cable port that communicates pixel values to a peripheral display. An end user is thus able to dock or otherwise use the portable information handling system in a desktop environment so that visual images are available for presentation at both the integrated display and at a peripheral display that typically offers a larger display area. In many instances, the integrated display includes a touchscreen surface that accepts end user touch inputs, such as when a portable information handling system is configured as a tablet.

Flat panel display technology continues to improve over time by providing better resolution with thinner structures having hardened display surfaces. Resolution has improved through the inclusion of greater numbers of pixels that refresh at more rapid rates. For example, high definition displays that include an array of 1920×1080 pixels to present images are now transitioning to ultra-high definition or 4K arrays of 3840×2160 pixels. The greater number of pixels allow finer details in the image and also present larger image areas with less impact on image quality. Improved refresh rates update pixel values more rapidly to better adapt to moving images. Thinner structures with liquid crystal displays (LCDs) have resulted from more effective backlights, such as the use of LED's instead of CFLs. Even thinner structures have become possible with the adoption of organic light emitting diode (OLED) pixels that generate light instead of relying on a backlight. Hardened display surfaces protect the pixel material and accept end user touches as inputs without damage to a transparent surface, such as scratches that distract from image quality. For example, Gorilla glass or sapphire surfaces resist damage through most normal usage scenarios and withstand impacts, such a dropping of the display.

Touchscreen display surfaces typically detect end user inputs with capacitive sensing of touches at the display surface. Generally, logic in an embedded controller of the information handling system distinguishes finger touches from other touches by filtering detected touches by size. For example, if an end user rests a palm on the touchscreen, the palm touch is disregarded as not an intended input. Recently, touchscreen displays have become a desktop peripheral that an end user can use to interface with an information handling system to enhance interactivity. A horizontally-disposed touchscreen display, such as a display placed on a desktop, presents user interfaces, such as a keyboard or touch pad, that the end user can interact with instead of relying on physical devices. For example, a keyboard is displayed on the horizontally-disposed display so that an end user can type inputs detected as touches of the displayed keys. Presenting graphical interfaces and menus on the horizontally-disposed display provides an end user with greater flexibility to configure a desktop environment to accomplish desired tasks both by controlling an application output presented at a second vertically-disposed display and by accepting inputs at the horizontally-disposed display.

One difficulty that arises in such a use case is that the touchscreen display tends to have difficulty resolving between intentional touches made by a finger, intentional touches made by a physical device, such as a keyboard, totem or other physical tool placed on the touchscreen display surface, and unintentional touches that are not meant to be inputs. One solution is to place an array of conductive pads on a physical device that equate to a finger for a touch discriminator touch event filter. The touch discriminator continuously analyzes touches to see if "fingers" are placed in a static array or pattern, and then marks the array or pattern as a physical device, such as a totem. However, processing related to such analysis slows the physical device detection and, in some instances, partial detection of the array of "fingers" results in inaccurate identification and discrimination between finger touches and physical device touches. In an active desktop environment, end user interactions may become confused between finger and physical devices, resulting in a reduced end user experience.

SUMMARY OF THE INVENTION

Therefore, a need has arisen for a system and method which provides touch discrimination for touches provided to an information handling system through a horizontally-disposed touchscreen display.

In accordance with the present invention, a system and method are provided which substantially reduce the disadvantages and problems associated with previous methods and systems for discriminating touches as input events at a touchscreen display. A tool discriminator applies a tool filter to touches detected at a touchscreen to identify tools touching the touchscreen before the touches are analyzed as intended or unintended inputs. Touches associated with a tool are assigned a tool function so that analysis by a touch discriminator for intended or unintended inputs is bypassed. Instead of looking for an array of plural finger touches to discriminate a tool, individual touch points resolved within a finger touch area, such as touch points arranged to have a predetermined shape, are resolved at a touch layer driver level for more rapid and accurate tool discrimination.

More specifically, an information handling system processes information with a processor and memory, and presents the information as visual images at a touchscreen display that accepts touches as inputs. Touches made at the touchscreen are processed by a touch controller and provided to the processor for use as inputs. A touch discriminator, such as firmware running on the touch controller or in a touch layer driver, analyzes touches at the touchscreen to determine touches intended as an input, such as touches by a finger, and unintended touches that are not processed as inputs. In a horizontal disposition, such as resting on a desktop surface, the touchscreen display interacts with tools that are placed on the touch surface, such as a totem or physical keyboard. A tool discriminator detects tool touches by comparing touch points detected on the touchscreen display with tool profiles of a tool filter that associates predetermined touch point configurations with predetermined tools. The tool discriminator performs a tool touch filter analysis upon initial detection of a touch at the touchscreen and before analysis by the touch discriminator as an intended or unintended touch. The tool discriminator filters out tools by plural unique independent touch pattern points that fall within an area of a finger touch or less so that tool identification and assignment occurs without latency related to finger or other intended touch input detection.

The present invention provides a number of important technical advantages. One example of an important technical advantage is that touches made at a touchscreen display are quickly and accurately discriminated between intentional touches and unintentional touches by both an end user finger and one or more physical tools placed on the touchscreen surface. Existing finger touch discrimination is leveraged by first filtering detected touches for known tools and then applying finger touch discrimination analysis to touches that do not filter as known tools. Tool surfaces that contact the touchscreen display have a unique signature that is readily detected by a tailored filter and readily distinguished from finger touches. The tool filter seeks tool-specific touch patterns within an area normally associated with a single finger touch so that a rapid scan of touches at the display is performed without adding latency to existing finger touch detection. If a tool touch profile is not found by the tool filter, touchscreen operations are performed in a conventional manner. If a tool touch profile is detected by the tool filter, rapid assignment of tool features without delay from finger touch analysis provides an end user with an improved user experience and low latency tool recognition and use. By using touchpoint arrangements within a finger touch area to distinguish a tool instead of an arrangement of finger touches, smaller tools may be used that do not have touch feet configurations constrained to accommodate finger touch array patterns.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system discriminates a tool touch at a touchscreen before analysis for finger or other types of intended touch inputs to improve touch detection latency at a touchscreen. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
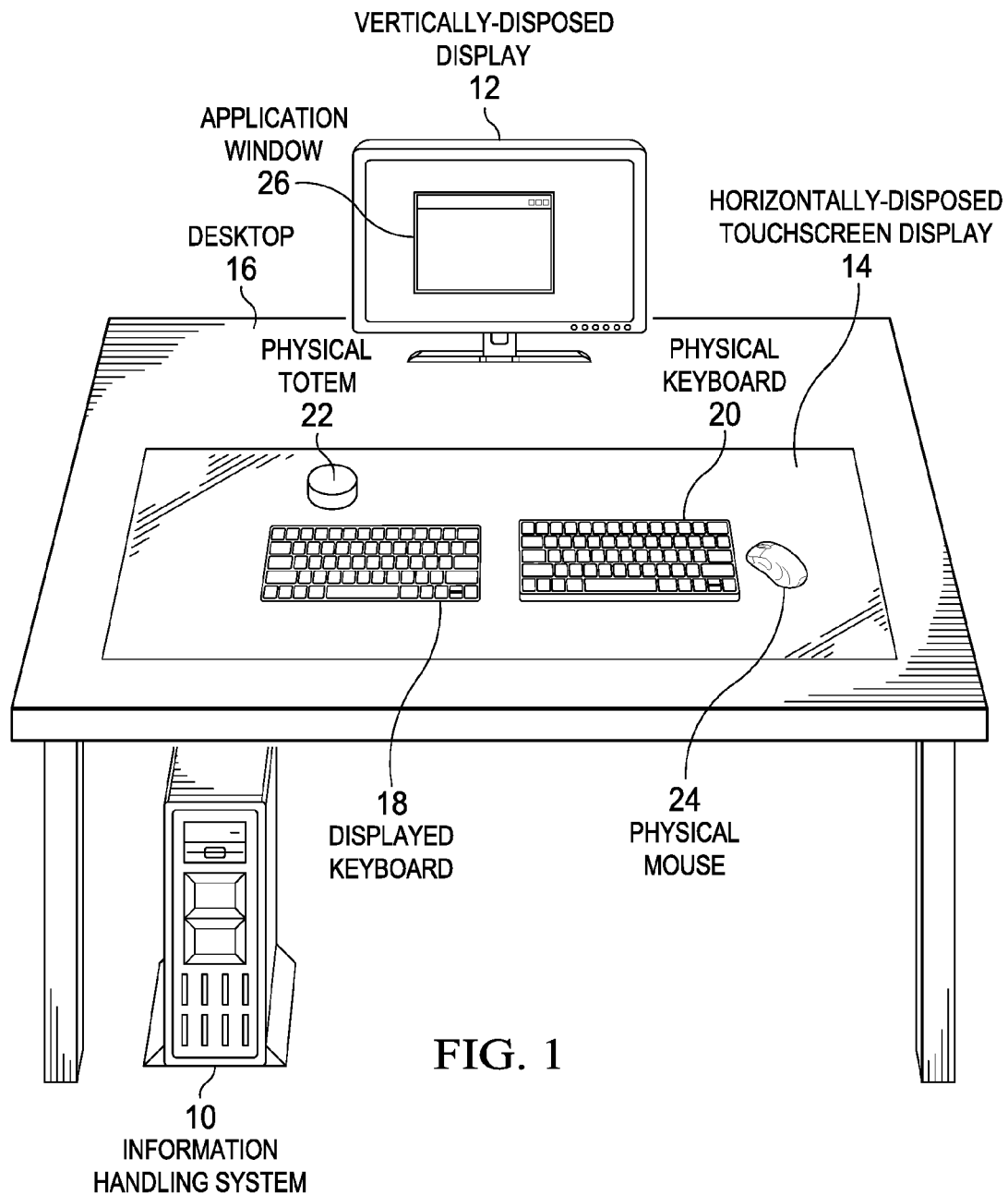
FIG. 1 depicts a desktop environment having an information handling system interacting with a vertically-disposed display and a horizontally-disposed display.

Referring now to FIG. 1, a desktop environment depicts an information handling system 10 interacting with a vertically-disposed display 12 and a horizontally-disposed display 14. Information handling system 10 includes processing components, such as a processor and memory, which processes information for presentation at displays 12 and 14 as visual images. Information handling system 10 accepts inputs from a variety of input devices, such as a physical keyboard 20 and physical mouse 24 to generate information responsive to an end user's inputs. In the example embodiment, a touchscreen display 14 is horizontally disposed on a desktop surface 16 to operate as a work surface that accepts touch inputs from an end user for communication to information handling system 10, such as inputs made with finger touches. Information handling system 10 communicates input and output information between the input and output devices through cables, such as USB or display cables, and/or through wireless signals, such as wireless local area network signals and/or wireless personal area network signals. In the example embodiment, an application window 26 presents visual images of an application running on information handling system 10 on vertically-disposed display 12 responsive to inputs by an end user through physical devices, such as keyboard 20, and virtual devices presented at horizontally-disposed display 14, such as a displayed keyboard 18 or other displayed user interfaces at display 14.

The touch surface of horizontally-disposed display 14 provides an interface through which an end user may perform inputs using physical tools as input aids. One example of a physical tool is a physical totem device 22 that rests on display 14 and translates end user inputs as touches to display 14. For example, rotating of totem 22 is detected by touchscreen display 14 so that the rotating motion is provided as an input to information handling system 10, such as by changing menu selections. Similarly, taps and presses made at totem 22 are translated as inputs similar to a mouse click by having a touch performed at display 14 that is interpreted by a tool driver, such as when a plunger descends from an elevated position to tap the touchscreen surface of display 14. Another example of a physical tool is a physical keyboard 20 having keys that translate taps into contacts at touchscreen display 14. A touch controller that accepts touch inputs from display 14 determines the pressed key by the tap position relative to portions of the keyboard resting on display 14. Another example is a physical mouse 24 that provides mouse inputs through touch locations at display 14. In various embodiments, various other types of physical devices may aid an end user in performing inputs through display 14, such as by translating physical movements of the end user through the physical device to the touchscreen display 14.

One difficulty with performing inputs through physical tools at touchscreen display 14 is that conventional touch discrimination algorithms seek to determine finger touches and then to disregard non-finger touches detected at display 14 as unintended touches. Finger touch discriminators operate on a touch controller, such as an embedded or keyboard controller, to filter out touches not typically associated with fingers, such as palm touches and, in many instances, touches by non-human physical devices. A horizontally-disposed display 14 that accepts tool touches as inputs tends to experience latency during processing by the touch controller that includes tool touches as intended inputs. For example, a tool is discriminated by detecting plural finger touches that have relative positions matching a known array of tool contact points. Thus, the touch layer driver first detects a tool as a plurality of finger touches, and then discriminates the tool based upon the arrangement of finger touches. In order to reduce such latency, tools 14 have identification factors that provide rapid recognition by the touch controller so that tools are identified and configured from a tool touch before more complex touch detection algorithms are performed. For example, the tool foot portion that contacts touchscreen display 14 surface includes touch areas that form a pattern having a size of substantially the same area as that used by the touch controller to detect a finger touch. Placing a touch area pattern with plural independent touch points that fall within the area expected by a finger touch enables a tool discriminator running on the touch controller to rapidly identify tool touches and configure tool functions without performing a finger touch analysis that looks for an arrangement of finger touches. Pre-analysis for tool touches reduces latency associated with tool use on touchscreen 14 both by providing more rapid tool configuration, but also by simplifying touch detection algorithms that filter out and disregard unintended touch inputs.

Figure 2:
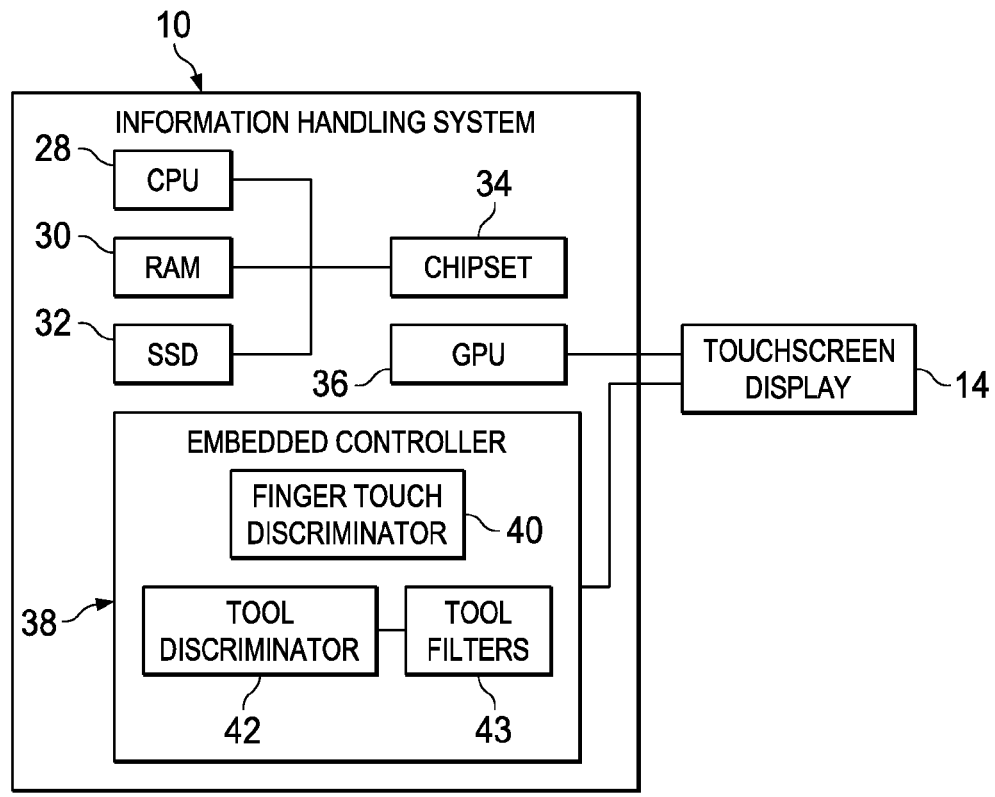
FIG. 2 depicts a block diagram of an information handling system configured to discriminate tool and finger touches.

Referring now to FIG. 2, a block diagram depicts an information handling system 10 configured to discriminate tool and finger touches. Information handling system 10 processes information with a central processing unit (CPU) 28 stored in a random access memory (RAM) 30. Persistent storage is provided by a solid state drive (SSD) 32 or other persistent storage device, such as to store an operating system and applications that are called into RAM 30 for execution by CPU 28. A chipset 32 includes a variety of processing components and firmware instructions stored in flash memory to coordinate operation of the processing components, such as a basic input/output system (BIOS) that boots an operating system executing on CPU 28. For example, chipset 34 includes or coordinates operations of a graphics processing unit (GPU) 36 that generates pixel information for presentation of visual images at display 14. An embedded controller 38 manages interactions with peripherals and other physical devices, such as keyboard inputs, mouse inputs and touch inputs at touchscreen display 14. In various embodiments, a BIOS or other firmware logic is distributed through chipset 34, GPU 36 and embedded controller 38 to manage inputs, outputs and power distribution, as well as other physical interactions in cooperation with an operating system, such as an operating system touch layer driver. In other embodiments, specific hardware and firmware components manage touchscreen display 14 touch inputs, such as a dedicated touch controller. The present invention as described below may operate across different physical processing components as appropriate for different hardware configurations.

In the example embodiment, a finger touch discriminator 40 stored in flash memory executes on embedded controller 38 to discriminate finger touches. Finger touch discriminator 40 analyzes touches made at touchscreen display 14 to discriminate intended inputs, which are forwarded to CPU 28, from unintended inputs, which are disregarded. In various embodiments, finger touch discriminator 40 applies different types of algorithms to distinguish intended from unintended touches. For example, touches that have a touch area that approximates a finger size are compared with a filter representing finger inputs to associate the touches with an input function. In contrast, touches that have a touch area that approximates a palm are compared with a filter representing palm inputs and disregarded. Logic within finger touch discriminator 40 analyzes touches of an intermediate nature to attempt to align detected touches with intended inputs. The analysis of intermediate sized shapes may also be performed with logic operating on CPU 28 and/or within an application active at the information handling system 10. Latency is sometimes introduced by more complex analysis that can detract from an end user experience. Tuning finger touch discriminator 40 to more precisely identify touch intentions can lead to greater latency as embedded controller 38 and CPU 28 attempt to distinguish more complex touch patterns. In contrast, more simple analysis that is less precise will sometimes disregard intended inputs, leading to a poor end user experience.

Tools placed on touchscreen display 14 tend to introduce more complex touch patterns that can introduce latency to touch detection and discrimination between intended and unintended touches. To alleviate latency in touch discrimination, a tool discriminator 42 stored on embedded controller 38 analyzes touches before finger touch discriminator 40 to identify and isolate tool touches without invoking finger touch discriminator 40. Tool filters 43 maintained by tool discriminator 42 include a discrete set of readily identified patterns that are quickly compared against detected touches to identify tools. If touches detected at touchscreen display 14 and analyzed by tool discriminator 42 match a pattern in touch filter 43, then tool discriminator 42 assigns a tool function to the associated touches and bypasses analysis by finger touch discriminator 40. For example, tool touches are assigned to a tool driver function of the operating system that manages communication of tool inputs to CPU 28. Bypassing analysis by finger touch discriminator 40 provides a rapid low latency tool function assignment and simplifies analysis of finger touch discriminator 40 by removing tool profiles from its filter. In various embodiments, tool profiles are defined to help distinguish other types of touches so that tool discriminator 42 does not inadvertently bypass finger touch discriminator 40 with non-tool touches. For example, each tool includes plural independent touch points disposed within a touch area that approximates the size of a finger touch area. The size of the finger touch area may be based upon an expected finger touch area or a value communicated from the finger touch discriminator 40 to the tool discriminator 42. Restricting tool discriminator 42 tool filters 43 to an area of a finger touch or less that includes plural touch points provides rapid analysis with minimal impact on the performance of finger touch discriminator 40.

Figure 3:
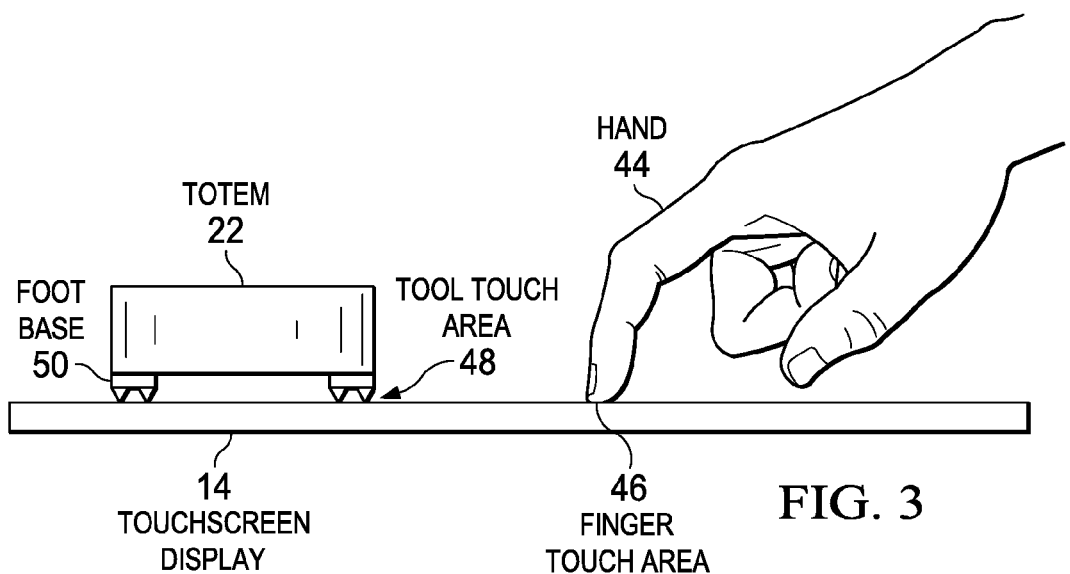
FIG. 3 depicts a side view of a touchscreen display having a tool disposed on a touch surface with a tool touch profile detected by the touch discriminator.

Referring now to FIG. 3, a side view of a touchscreen display 14 depicts a tool 22 disposed on a touch surface with a tool touch profile detected by the touch discriminator. In the example embodiment, a hand 44 is depicted with a finger pressed on touchscreen display 14 at a finger touch area 46. Tool 22 has a foot base 50 with a tool touch area 48 of substantially the same size as finger touch area 46. In alternative embodiments, tool touch area 48 may have a smaller size than finger touch area 46 with the maximum size defined in tool filter 43 to provide a more rapid tool touch discrimination. Foot base 50 includes plural independent touch points disposed within tool touch area 48. The location of the plural independent touch points are stored in tool filter 43 as a profile associated with a defined tool type so that a match between a tool filter 43 profile and detected plural independent touch points triggers configuration of touchscreen display 14 to interact with a driver associated with the tool. For example, plural touch points at foot base 50 are arranged within an area of less than finger touch area 46 to form specific shapes, such as a triangle, square, circle, pentagon, etc., or with defined distances between the touch points. In one embodiment, the touch points of foot base 50 use a defined size to further narrow the identification algorithm, such as size that is approximately equal to the size of a pixel of touchscreen display 14.

In various embodiments, the configuration of touch points within a finger touch area have a relative location based upon the touch resolution of a touchscreen display 14. Tool 22 foot base 50 has plural touch points disposed with dimensions having sufficient separation for detection of the individual touch points by the touchscreen driver. Foot base 50 disposes the touch points within an area normally associated with a finger touch, with the area based upon as expected finger touch detection area for the touch driver detection algorithm. Thus, the specific spacing of touch points on a foot base 50 may vary based upon touchscreen resolution and finger touch detection settings. For example, the distance between touchpoints of a foot base 50 will be sufficient for resolution by a touchscreen of the individual touchpoints while the overall size of the touchpoint arrangement will fall within a size associated with a finger touch. In one example embodiment, touch resolution is associated with pixel resolution so that a touchpoint will have approximately a pixel of size. In alternative embodiments, where sufficient touch resolution is available, the surface touch area of individual touch points on foot base 50 may provide additional information relating to the identification and orientation of a tool 22. For example, with three touch points disposed within a finger touch area in a triangle shape, one touch point within foot base 50 will have three pixels of touch area compared with one pixel for the other two touch points, thus providing tool discriminator 42 with information to rapidly determine both the identity and orientation of the tool.

Figure 4:
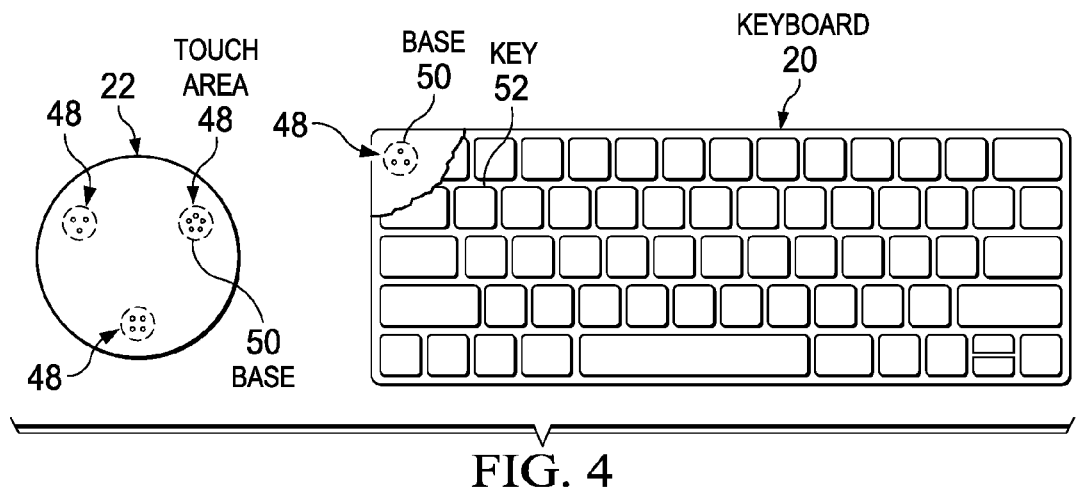
FIG. 4 depicts a bottom view of some example tools having tool touch areas configured for identification by a tool discriminator.

Referring now to FIG. 4, a bottom view depicts some example tools 20 and 22 having tool touch areas configured for identification by a tool discriminator 42. One example is a totem 22 with three foot bases 50, each having plural touch points disposed in distinguishable patterns in an area of less than a finger touch area 46. In the example embodiment, one foot base 50 has three touch points disposed in a triangle shape, another foot base 50 has four touch points disposed in a square, and a third foot base 50 has five touch points forming a pentagon with a defined distance between each touch point. Keyboard tool 20 includes plural keys 52 that each perform touch inputs at display 14 when a key is pressed. At one corner of keyboard 20, a base 50 includes plural touch points to provide a location and orientation of keyboard 20 that provides a reference point for identifying key touches. During keyboard operation, tapping on a key 52 provides a touch that is determined as a key input based on relative location of the key 52 to base 50. The location and orientation of keyboard 20, and thereby the location of keys 52, is rapidly isolated by tool discriminator 42 without initiation of the more complex finger touch discriminator logic using the relative position and/or relative size of touch points 50 to indicate the keyboard orientation.

Figure 5:
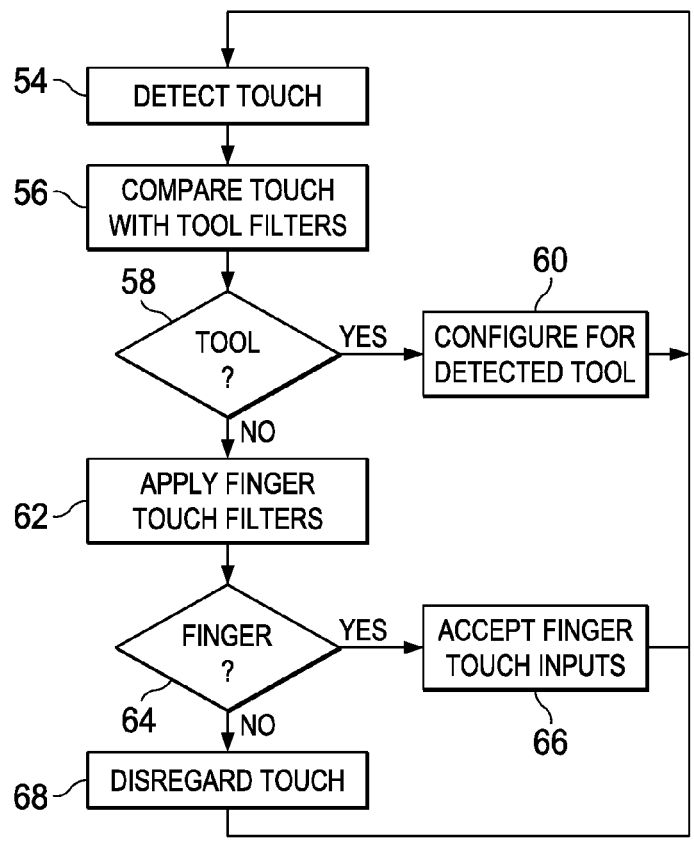
FIG. 5 depicts a flow diagram of a process for discriminating tool touches before applying a finger touch algorithm.

Referring now to FIG. 5, a flow diagram of a process for discriminating tool touches before applying a finger touch algorithm. The process starts at step 54 with detection of a touch at a touchscreen display 14. At step 56, the detected touch profile is compared with profiles of the tool touch filter to find any tool touch matches. Since the comparison of the touches is performed against a limited filter predefined tool touches, minimal time a processing resources is required to determine that a tool is located on the touchscreen display. At step 58, a determination is made of whether the detected touches match a tool touch profile. If yes, the process continues to step 60 to configure the touchscreen for control of the detected tool at the touch location, such as by assigning touches in the area to an appropriate tool driver. The process then returns to step 54 to continue monitoring touches without having the tool touches processed by a finger touch discriminator or other logic that discriminates intentional and unintentional touches. If at step 58 a determination is made that the touches are not associated with a tool, the process continues to step 62 to perform additional processing that discriminates between intentional and unintentional touches. For example, at step 62 a finger touch filter is applied to determine if the non-tool touches are intentional finger touch inputs. At step 64, if the touches are associated with a finger or other intentional input, the process continues to step 66 to accept the touch input and then to step 54 to continue monitoring for additional touch inputs. If at step 64 the touches are not associated with a finger touch input, the process continues to step 68 to disregard the touch input and to step 54 to continue monitoring for touches.

Figure 6A:
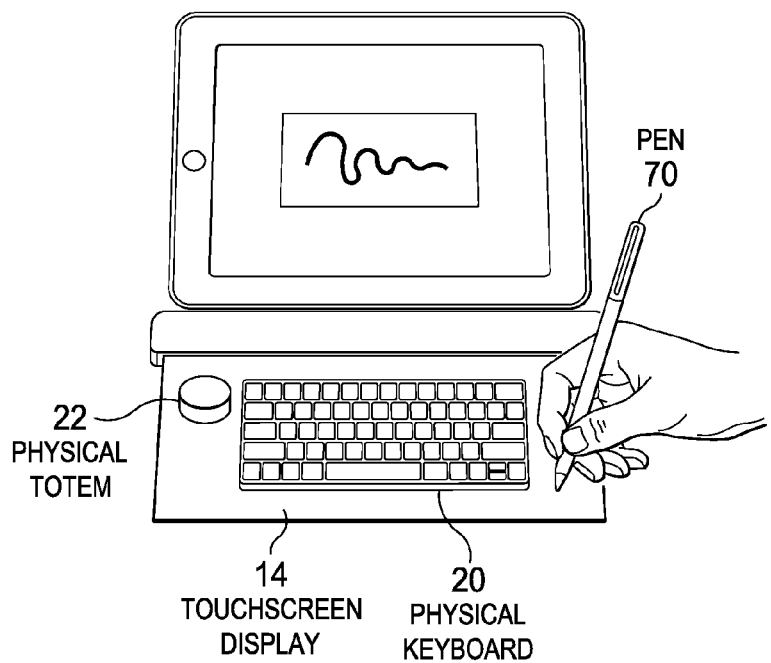
FIGS. 6A and 6B depict a multi-tool environment having pressure sensor feedback to aid in tool distinction.
Figure 6B:
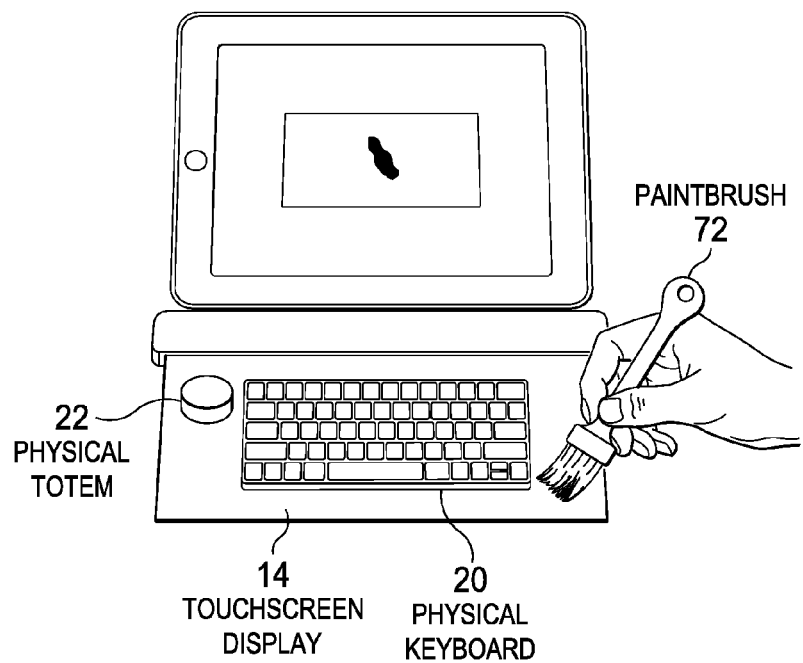

Referring now to FIGS. 6A and 6B, a multi-tool environment depicts pressure sensor feedback to aid in tool distinction. In the example embodiment of FIG. 6A, a pen 70 writes on touchscreen display 14, which also has a totem 22 and keyboard 20 resting on the touch surface. The foot base 50 of totem 22 and keyboard 20 have individual touch points disposed within a finger touch area that provide rapid identification of each tool as set forth above. Pen 70 is distinguished as a single touchpoint at the location that pen 70 touches touchscreen display 14 so that the pen trace across touchscreen 14 is presented on information handling system 10. In addition to the use of the foot base 50 tool profile, tool discriminator 42 applies sensed pressure of tools to identify, manage and differentiate tools. For example, as pen 70 is pressed along touchscreen display 14, variations in pressure are used as an input to control the drawn line appearance, such as its thickness. In addition, the variations in pressure, movement of the pressure point and the single contact point indicate the use of a pen 70 tool. In contrast, totem 22 and keyboard 20 have a constant pressure when resting on touchscreen display 14 and not in use. The constant pressure provides a reference for identification of each tool based upon weight calibration. For example, if multiple tools are associated with a touch pattern in tool filter 43, then the weight of the detected tool is compared against expected weights to differentiate tools with common touch patterns. Other indicia may also be applied, such as an image captured by a camera of the tool or a Bluetooth interface with tools that support active communication.

FIG. 6B depicts an alternative embodiment where a paintbrush tool 72 performs an input at touchscreen display 14. Touchscreen display 14 detects the difference in pressure and touch area of paintbrush 72 compared with pen 70 so that the displayed input has a brush appearance. In a similar manner, inputs made at tools will alter the weight sensed for the tool on touchscreen 14. For example, totem 22 will have a greater weight calibration value and a changing weight calibration value at its foot bases 50, thus indicating end user interactions are taking place. Similarly, keyboard 20 will have varying weight calibration values if a palm rests on the keyboard structure or keys are being actively used. During user interactions, such as when inputs are being actively accepted at a tool, tool discriminator 42 relies upon touch profiles of tool filter 43 to track the tool position. After inputs are complete, weight sensing may again be used as a reference for tool identification and tracking. In one embodiment, processing resources may be allocated to selectively engage touch tracking of tool positions and weight calibration tracking. For example, if a tool is placed at rest on touchscreen display 14, the location and identification of the tool may be tracked by its sensed pressure input so that, during periods of inactivity, less processing resources are used to identify and track the tool. Upon detection of a pressure change at a tool location that indicates end user activity, tool discriminator 42 shifts to an active tracking mode where touch point locations provide tool identity and location. Tracking touch point locations provides more accurate analysis of tool types and input in an active desktop environment with some increase on power consumption and latency. In one alternative embodiment, tools are divided between active and passive states by determining the weight calibration of the tools. An active tool having a greater than expected pressure value will transition to active tracking using touchpoints of each foot based. A passive tool having an expected pressure value will use passive tracking that bases tool identity on a previously-detected touch profile, perhaps with occasional confirmation of the touch profile to confirm the tool identity and location. In this manner, energy consumption and response latency are effectively reduced.

Although the present invention has been described in detail, it should be understood that various changes, substitutions and alterations can be made hereto without departing from the spirit and scope of the invention as defined by the appended claims.

What is claimed is:

1. An information handling system comprising:
a processor disposed operable to execute instructions to process information;
a memory interfaced with the processor, the memory operable to store the information;
a display interfaced with the processor and memory, the display operable to present the information as visual images, the display having a touchscreen surface operable to detect touch inputs;
a controller interfaced with the display and operable to communicate touches detected as inputs to the processor;
a finger touch discriminator stored in the controller and operable to compare touch inputs against a finger filter to discriminate between finger touches intended as inputs and unintentional touches not intended as inputs; and
a tool discriminator stored in the controller and operable to compare touch inputs against a tool filter to discriminate tool touches, the tool discriminator configuring touches detected as tools to accept tool touch inputs;
wherein the tool discriminator compares touches before the finger touch discriminator, the tool discriminator bypassing the finger touch discriminator if a tool touch is detected.

2. The information handling system of claim 1 wherein the tool filter comprises a configuration of plural independent touches having a predetermined shape, the shape defining a perimeter sized to less than a finger perimeter.

3. The information handling system of claim 2 wherein the plural independent touches comprises a triangle shape.

4. The information handling system of claim 2 wherein the tool discriminator is further operable to confirm a tool identity by comparing a detected pressure sensed in association with the tool and an expected weight calibration of the tool.

5. The information handling system of claim 1 wherein the tool comprises a totem having plural foot bases, each foot base having plural independent touches of a predetermined shape.

6. The information handling system of claim 1 wherein the tool comprises a keyboard having plural keys, each key having plural independent touches of a predetermined shape.

7. The information handling system of claim 1 wherein the tool filter comprises plural shapes, each shape defined by plural touch points, each touch point having a size of approximately a display pixel.

8. A method for at a portable information handling system, the method comprising:
detecting a touch on a touchscreen;
in response to detecting the touch, comparing the touch with a tool filter to determine whether the touch is associated with a tool;
if the touch is associated with the tool, configuring the touchscreen to manage the touch as a tool input; and
if the touch is not associated with the tool, applying a finger touch filter to determine if the touch is associated with a finger input;
wherein comparing the touch with a tool filter further comprises:

detecting a touch area having plural touch independent points disposed within a size that approximates a finger touch; and determining a tool if the plural touch independent points form a predetermined shape.

9. The method of claim 8 further comprising:

determining that the touch is not associated with a finger input; and in response to the determining, disregarding the touch input.

10. The method of claim 8 wherein the predetermined shape comprises a square.

11. The method of claim 8 further comprising tracking the tool by reference to the predetermined shape for a predetermined sensed pressure value at the tool location, and tracking the tool by reference to a sensed pressure value if the sensed pressure value equals an expected weight calibration of the tool.

12. The method of claim 8 wherein the predetermined shape identifies the tool type.

13. A touchscreen display having tool interactivity, the touchscreen display comprising:

a display operable to present information as visual images and having a surface that detects touches;

a touch discriminator that filters touches to discriminate between touches intended as an input and touches not intended as an input; and a tool discriminator that filters touches according to a tool filter to discriminate touches of a tool at the surface;

wherein the tool discriminator filters detected touches before the touch discriminator and assigns touches discriminated as tools to tool functions to bypass the touch discriminator for touches discriminated as tool touches.

14. The touchscreen display of claim 13 wherein the touch discriminator filters touches only after the tool discriminator determines the touches are not tool touches.

15. The touchscreen display of claim 14 wherein the tool discriminator applies a tool filter having one or more tool profiles, each tool profile having a touch area of less than a finger touch area and having plural independent touch areas within the touch area.

16. The touchscreen display of claim 15 wherein each of the plural independent touch areas has a size of substantially the same size as a display pixel.

17. The touchscreen display of claim 15 wherein the plural independent touch areas form a pattern matching a pattern of the tool filter and a weight calibration associated with pressure sensed at the tool location.

18. The touchscreen display of claim 17 wherein the tool filter comprises plural patterns, each pattern associated with a predetermined tool.

* * * * *